United States Patent [19]

Hodgens, II et al.

[11] Patent Number: 4,713,120

[45] Date of Patent: Dec. 15, 1987

[54] METHOD FOR CLEANING A GAS TURBINE ENGINE

[75] Inventors: Henry M. Hodgens, II, Jupiter; William A. Cellich, Boynton Beach, both of Fla.

[73] Assignee: United Technologies Corporation, Hartford, Conn.

[21] Appl. No.: 829,044

[22] Filed: Feb. 13, 1986

[51] Int. Cl.[4] .......... C23G 1/02; C03C 23/00; B08B 9/00; B08B 30/00

[52] U.S. Cl. .......... 134/3; 134/2; 134/22.17; 134/22.19; 134/28; 134/29; 134/33

[58] Field of Search .......... 134/2, 3, 22.17, 22.19, 134/28, 29, 33

[56] References Cited

U.S. PATENT DOCUMENTS

| | | | |
|---|---|---|---|
| 2,396,938 | 3/1946 | Bersworth | 134/2 |
| 2,796,366 | 6/1957 | Carter | 134/2 |
| 3,272,738 | 9/1966 | Pitzer et al. | 210/51 |
| 3,397,149 | 8/1968 | Gruber | 252/181 |
| 3,494,793 | 2/1970 | Lenz et al. | 134/21 |
| 3,506,576 | 4/1970 | Teumac | 134/3 X |
| 3,669,776 | 6/1972 | Eppensteiner | 134/2 X |
| 3,684,720 | 8/1972 | Richardson | 134/2 |
| 3,721,626 | 3/1973 | Stanek et al. | 134/2 |
| 4,035,836 | 7/1977 | Noguchi et al. | 252/545 |
| 4,059,123 | 11/1977 | Bartos et al. | 417/364 |
| 4,065,322 | 12/1977 | Langford | 134/7 |
| 4,132,816 | 1/1979 | Benden et al. | 427/237 |
| 4,317,685 | 3/1982 | Ahuja et al. | 134/2 |
| 4,377,489 | 3/1983 | King | 134/2 X |
| 4,430,128 | 2/1984 | Frenier et al. | 134/29 X |
| 4,439,241 | 3/1984 | Ault et al. | 134/22 |
| 4,511,407 | 4/1985 | Steininger | 134/3 X |
| 4,512,921 | 4/1985 | Onstine et al. | 134/3 X |
| 4,554,049 | 11/1985 | Bastenbeck | 134/3 X |

*Primary Examiner*—Andrew H. Metz
*Assistant Examiner*—William G. Wright
*Attorney, Agent, or Firm*—William J. Sapone

[57] ABSTRACT

A composition and method for removing deposits (10) from the internal components (24) of a gas turbine engine (18) utilizing a cleaning composition (15) which comprises an aqueous solution of hydroxylamine sulfate, a chelating agent, a compound selected from the group consisting of ammonium sulfamate, ammonium sulfamide, and hydroxylamine-o-sulfonic acid, and, an alkaline pH modifying substance added in an amount sufficient to achieve a pH value of between 6.5 and 14. The method involves contacting the deposits with the cleaning composition, such as in an apply and soak type pattern, chemically dislodging the deposits from the component surfaces. The engine is rinsed to remove the dislodged deposits and residual cleaning composition.

10 Claims, 6 Drawing Figures

METHOD FOR CLEANING A GAS TURBINE ENGINE

The Government has rights in the invention pursuant to Contract No. F33657-84-C-2122 awarded by the Department of the Air Force.

TECHNICAL FIELD

This invention relates to engine cleaning and more particularly to a composition and method for cleaning a gas turbine engine installed on an aircraft.

BACKGROUND ART

Gas turbine powered aircraft operate in many areas of the world and consequently encounter many different environmental conditions. In desert area flight operations, large quantities of airborne sand particles significantly affect engine performance. Such sand enters a gas turbine engine primarily during takeoff and landing, accumulating within the engine by adhering to the blades, vanes, and other internal engine components. In the high temperature engine sections, where temperatures may exceed 1000° C., a layer is gradually deposited on the various components as the entering sand effectively bonds to the hot component surfaces. The presence of these deposits decreases overall engine efficiency by increasing engine weight, modifying airfoil surface shapes, roughening smooth aerodynamic surfaces, and, with some types of dust, corrosively damaging critical engine components. Such a decrease in engine efficiency results in reduced engine thrust at a given engine speed. Typically, an engine must operate at higher speeds to compensate for the reduced thrust, thereby increasing fuel consumption and engine maintenance requirements.

In the hot turbine section of an engine, coatings are generally used to enhance the oxidation and hot corrosion resistance of superalloy articles. An aluminide coating, such as that disclosed in commonly assigned U.S. Pat. No. 4,132,816 to Benden et al, is exemplary of a typical protective coating. While the exact nature of the chemical bond is unknown, desert sand, such as that encountered in Dhahran, Saudi Arabia, is adhesive to such protective coatings, building up over a period of time on the hot coated surfaces and eventually flaking off due to thermal stress on engine cool down. Generally, a portion of the protective coating flakes off with the deposit. The cyclic build-up and flaking of these deposits on a coated surface eventually removes the protective coating, leading to failure of the substrate superalloy article.

Frequent removal of desert sand deposits from internal engine components is required to prevent such engine damage and to maintain optimum engine efficiency. Commercial detergent solutions are available for cleaning dirt deposits from the internal component surfaces of a gas turbine engine. However, these solutions are generally formulated for removing oil and dirt deposits from the cold compressor section of a gas turbine engine and have proven ineffective in removing sand deposits from the surfaces of such superalloy articles as the airfoil blades and vane clusters located in the hot engine sections.

Another method for removing dirt accumulations from the internal component surfaces of a gas turbine engine involves the introduction of abrasive particles in the airflow path of the engine. Such particles are carried through the engine by the flowing airstream, generally eroding any deposits on the engine surfaces by striking the deposits at high velocity. U.S. Pat. No. 4,065,322 to Langford discloses such a procedure in which carbon based particles are introduced into the airflow path of an engine while running. This procedure has several limitations. First, it is difficult to assure even distribution of the abrasive particles within the engine during operation. The flow of air through an engine, particularly a bypass type turbine engine, is highly complex, producing eddys and currents as the air flows around engine components. Since the flowing air carries the cleaning particles into these eddys and currents, uniform particle distribution and velocity cannot be maintained. Consequently, several areas of the engine are not cleaned while other areas are overly attacked by the flowing particles. Another limitation involves the accumulation of loosened debris and abrasive particles within the engine, thereby exchanging one deposit for another. This is a particular problem with airfoil blades having air cooling passages. The Langford disclosure discusses particles which essentially vaporize at hot engine temperatures thereby first cleaning the engine and then vaporizing and trapped carbon particles left behind after cleaning. However, since both the cleaning particles and loosened debris from the compressor section are traveling through the aft turbine section, a mixture of material may enter and block the cooling passages, thereby reducing cooling regardless of the vaporization ability of the cleaning particles.

The most certain way to assure proper engine cleaning is to frequently overhaul engines used in desert environments. Of course, such a procedure requires removal of the engine from the aircraft, dissembling the engine into its component parts, cleaning such parts by grit blasting or soaking in special solutions and then reassembling the engine. such a procedure is quite costly and time consuming, requiring excessive aircraft downtime.

DISCLOSURE OF THE INVENTION

It is an object of the present invention to provide a cleaning composition sufficiently active to dislodge baked on sand deposits from the internal component surfaces of a gas turbine engine without detrimentally effecting the alloys or coatings used therein.

It is a further object of the present invention to provide a highly active cleaning composition which is applicable at near ambient temperatures, thereby simplifying handling during the cleaning process.

It is another object of the present invention to provide a cleaning method which achieves uniform cleaning of a gas turbine engine installed on an aircraft, avoiding costly removal and disassembly of such an engine.

These and other objects of the present invention are achieved by utilizing an aqueous cleaning composition comprising 0.1–2.0 molar hydroxylamine sulfate (HS), a chelating agent, 0.1–4.0 molar concentration of a compound selected from the group consisting of ammonium sulfamate (AS), sulfamide (S), and hydroxylamine-o-sulfonic acid (HOSA), and, an alkaline pH modifying substance added to achieve a pH of between 6.5 and 14. While the actual mechanism for dislodging the deposits is uncertain, it is believed to involve a reaction between hydroxylamine and sulfamate ions, yielding a short lived reactive intermediate such as hydrazine, diimide, or hydride ion which reduces a superficial layer of the protective oxide on the surface of the component, resulting in the release of the sand deposit from the component surface. Once released, the deposits are sequestered by the chelating agent in the cleaning composition, preventing redeposition on another surface.

The method for cleaning an aircraft gas turbine engine involves contacting the deposit bearing components with a cleaning composition which comprises an aqueous solution of 0.1–2.0 molar hydroxylamine sulfate, a chelating agent, 0.1–4.0 molar concentration of a compound selected from the group consisting of ammonium sulfamate, sulfamide and hydroxylamine-o-sulfonic acid, and, an alkaline pH modifying substance added in an amount sufficient to achieve to pH of 6.5–14.0. The composition is preferably applied in alternate steps of application and soaking. After cyclically repeating a number of such application and soaking steps, the deposits are chemically released from the component surfaces. The engine is then rinsed with water or another suitable rinsing solution to remove both the dislodged deposits and any residual cleaning composition.

BEST MODE FOR CARRYING OUT THE INVENTION

For illustrative purposes, the cleaning of a model F-100 gas turbine engine manufactured by the Pratt & Whitney Aircraft Division of United Technologies Corporation is described. While utilizing an F-100 engine mounted on an aircraft for illustration, it will be understood by those skilled in the art that any gas turbine engine requiring removal of sand deposits from internal component surfaces can utilize this invention. For simplicity, the specific engine internals will not be discussed in detail. Suffice it to say that an F-100 engine has airfoil blades and vane clusters in the hot turbine section of the engine, for example, made of aluminide coated superalloys and manufactured to critical tolerances. These parts accumulate sand deposits during takeoff and landing from desert runways.

Figure 1A:
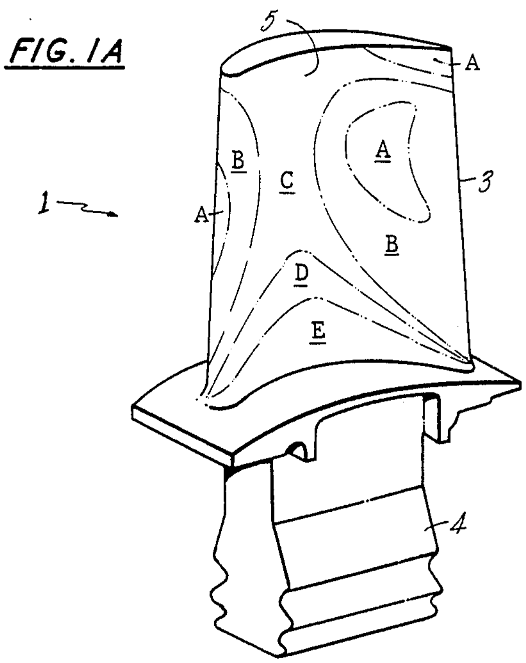
FIGS. 1 A and 1 B are isometric views of an airfoil blade and a vane cluster respectively, illustrating the typical surface temperature gradient that occurs during normal engine operations. The letters A through E denote decreasing temperature gradient regions, respectively.
Figure 1B:
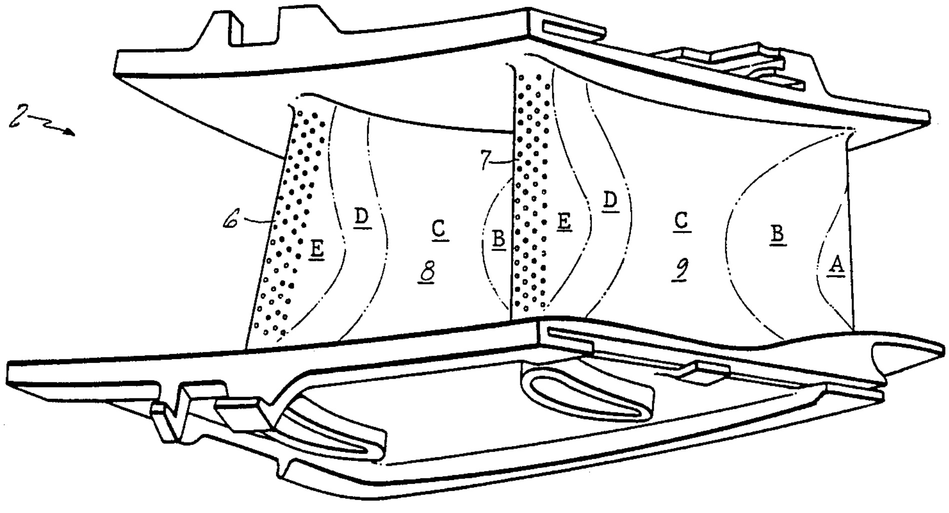
Figure 2A:
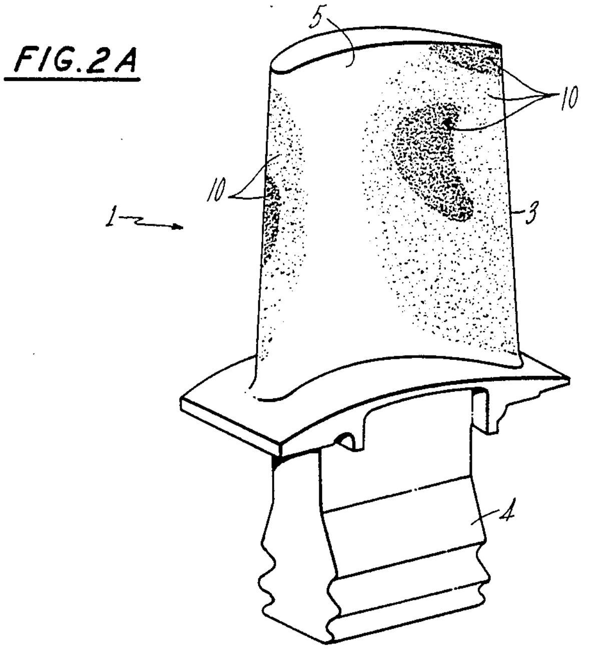
FIG. 2 A and 2 B are isometric views of an airfoil blade and a vane cluster respectively, illustrating typical deposit accumulation regions.
Figure 2B:
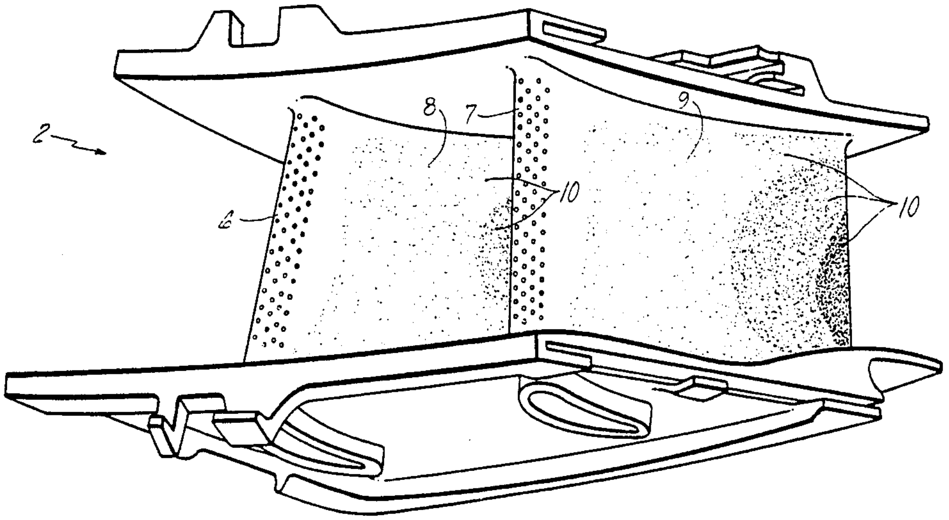

Referring to FIGS. 1 A and 1 B, a blade 1 and a vane cluster 2 are shown. Blade 1 includes an airfoil 3 and a root 4, airfoil 3 having an aerodynamically contoured surface 5. Similarly, vane cluster 2 has vanes 6 and 7 having aerodynamically contoured surfaces 8 and 9. For illustrative purposes, the surface temperature gradient regions which occur during normal engine operation are delineated, with the letters A through E denoting decreasing temperature, respectively. Referring to FIGS. 2 A and 2 B, sand deposits 10 adhere to the contoured surfaces 5, 8, and 9. Such sand deposits may partially comprise calcium carbonates which react in the hot turbine section to form first calcium oxides and then, reacting with sulfur in the combustion gas stream, calcium sulfate. It has been found that the tougher and thicker deposits occur on the higher surface temperature gradient regions, A, B, and C. High temperature interaction between the sand deposit and component surface may account for the deposit's resistance to prior art removal methods.

The cleaning composition of the present invention comprises an aqueous solution of 0.1–2.0 molar hydroxylamine sulfate (HS), a chelating agent, 0.1–4.0 molar concentration of a compound selected from the group consisting of ammonium sulfamate (AS), sulfamide (S), and hydroxylamine-o-sulfonic (HOSA) acid, and, an alkaline pH modifying substance added in an amount sufficient to achieve a pH of between 6.5 and 14. The preferred embodiment of the cleaning composition comprises an aqueous solution of 0.4 molar hydroxylamine sulfate, 0.7 molar ammonium sulfamate, 0.8 molar N-hydroxyethylethyenediaminetriacetic acid (HEDTA) with ammonium hydroxide (AH) added in an amount sufficient to achieve a pH of between 7 and 8.5, and, 0.4 molar ethylenediamine (EDA) added as both a pH stabilizer and additional chelating agent. Up to 2.0 Molar EDA may be used in the cleaning composition of the present invention. While HEDTA is used as the chelating agent in the preferred embodiment, other chelating agents are available as substitutes. These may include, but are not limited to, the following: nitrilotriacetic acid, N-methyliminodiacetic acid, and 1,2-diaminocyclohexane-N,N,N',N'-tetraacetic acid. Ammonium sulfamate is the least expensive compound from the selected compound group, and is therefore included in the preferred embodiment. While other alkaline pH modifying substances may be used, ammonium hydroxide is preferred to the alkali metal compounds, such as sodium hydroxide, to preclude the possibility of hot corrosion damage to the turbine components should ineffective rinsing occur.

In the first step of the cleaning method of the present invention, the inventive cleaning composition is contacted with the deposit bearing component surfaces. In preparing the preferred embodiment of the cleaning composition, two separate ingredient solutions are prepared, which, when mixed, comprises the preferred cleaning composition of the present invention. The two ingredient solutions are mixed about an hour prior to application to preserve the activity of the cleaning composition which diminishes with time. The first solution comprises an aqueous solution of 0.8 molar HS having a pH of between 3 and 4. The second solution comprises an aqueous solution of 0.8 molar EDA, 1.4 molar AS and 1.6 molar HEDTA with ammonium hydroxide (AH) added to achieve a pH of between 9 and 10. Upon mixing, the cleaning composition has a pH of between 7 and 8.5 and remains active for about four hours.

EXAMPLE

A first ingredient solution is prepared by adding 2270 grams HS to 16.650 liters water. A second ingredient solution is prepared by combining 2835 grams AS, 7580 grams HEDTA, 4.050 liters AH, 0.945 liters EDA and 6.595 liters water. Both solutions have a shelf life of about 45 days when stored separately at ambient temperatures at or below 27° C. (80° F.). A cleaning composition is prepared about an hour prior to cleaning an aircraft engine by mixing the two ingredient solutions together. This provides about 34 liters of the cleaning composition of the present invention.

Figure 3:
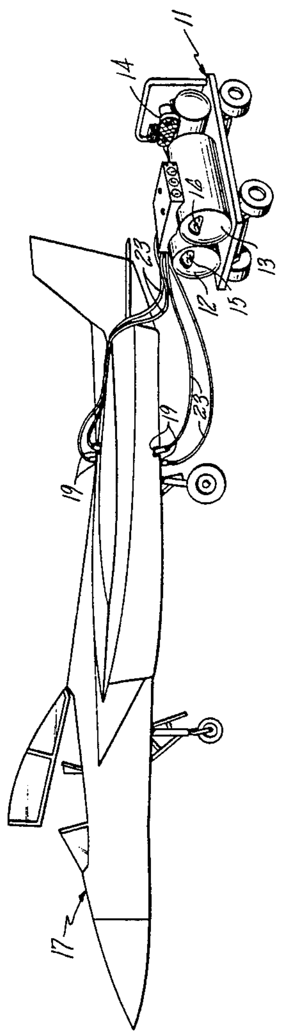
FIG. 3 is an illustration of the cleaning of an engine installed on an aircraft.
Figure 4:
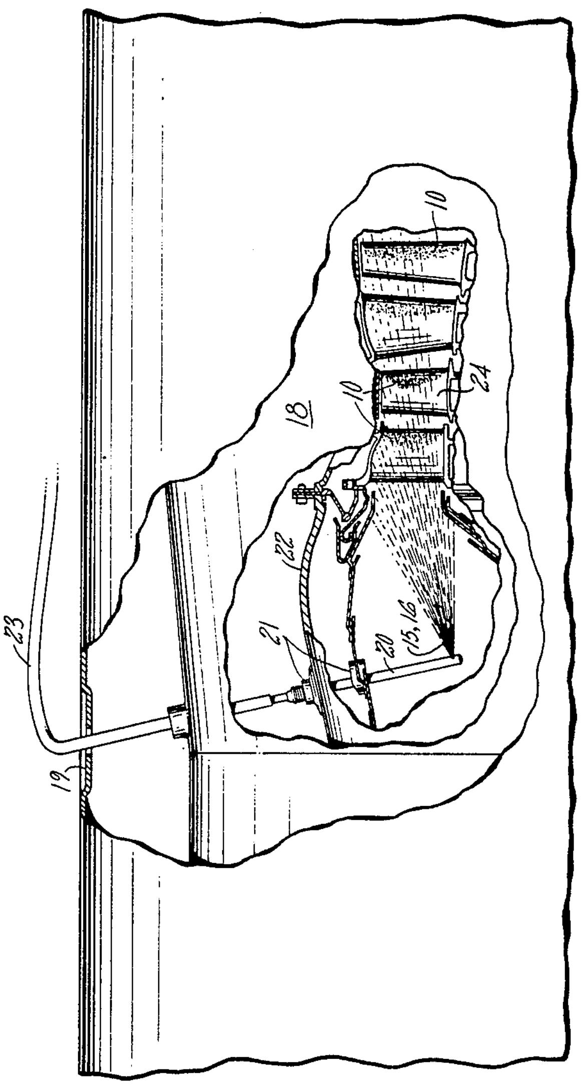
FIG. 4 is an enlarged elevation of an engine installed on an aircraft, illustrating the application of the cleaning composition of the present invention to the internal components thereof.

Generally, solution cleaning of an engine entails the use of a portable wash cart which allows pressurized spraying of a solution into an engine. Such means will be familiar to one skilled in the art. Referring to FIG. 3, a wash cart 11 has a cleaning composition container 12 and a rinse solution container 13 with an integral air compressor 14 provided for pressurizing containers 12 and 13. While a wash cart with an integral air compressor is discussed, it will be understood by one skilled in the art that any means for contacting the deposit bearing engine components with the composition of the present invention may be used. A cleaning composition 15, which comprises the cleaning composition of the present invention, is added to cleaning composition container 12. If the preferred embodiment of the cleaning composition is utilized, portions of the two ingredient solutions may be mixed, about one hour prior to application, in cleaning composition container 12. Rinse container 13 is then filled with a rinsing solution 16, preferably water. Referring to FIG. 3, an illustration of an aircraft 17 is shown during application of the preferred embodiment of the cleaning composition of the present invention. An engine 18 is prepared for cleaning by opening the access doors 19 which are provided for engine maintenance. Several boroscope ports are provided on the F-100 engine to allow visual inspection of the engine internals and are well suited for use as cleaning access passages. While such a procedure is disclosed for the F-100 engine, it will be understood by those skilled in the art that other access means may be used to contact the cleaning composition with the deposit bearing engine components. Referring to FIG. 4, a spray probe 20 is inserted through a boroscope port 21 on a wall 22 of engine 18 and axially aligned with the typical airflow path through the engine. Since the F-100 engine has four such ports, 4 probes (3 not shown) are inserted to assure maximum dispersal of the cleaning composition within the engine.

Referring still to FIG. 4, probe 20 is connected with a flexible hose 23 to wash cart 11 (not shown) and properly valved to allow flow control of the cleaning composition and rinse solution into engine 18. Cleaning composition 15 is applied to the deposits 10 on the internal engine components 24 by spraying into the engine for about 10–30 seconds. The engine may be turned by hand (windmilled) during application to further promote uniform distribution of the cleaning composition within the engine. Cleaning composition 15 is allowed to soak into the deposits for about 2–4 minutes, which allows surface reactions to occur. To properly clean the F-100 engine, about 15 such application and soak steps are cyclically repeated to assure adequate dislodging of the deposits from the engine components. Of course, the method of application and number of application and soak steps will vary depending on the engine type, severity of deposit accumulation and resistance to removal.

Rinsing is required to remove both the cleaning composition and loosened deposits from the engine. Rinse solution 16 may be applied in a similar cyclic application and soak pattern. Using water as the preferred rinsing agent, it was found that a 30 second application, while windmilling, followed by soaking for a 1½ minutes and then repeating for about 8 cycles provided adequate rinsing. As will be understood by those skilled in the art, any rinsing means which sufficiently removes residual cleaning composition and loosened deposits from the engine may be used. Spray probe 20 is then removed and the engine prepared for operation. The engine is then dried, preferably by opertion at two engine speeds. For an F-100 engine, running at idle for at least 5 minutes, at 80% of throttle for 5 minutes, then at idle for 5 minutes within 3 hours of cleaning, sufficiently dries the engine.

The preferred embodiment of the cleaning composition of the present invention has been evaluated for compatibility with the materials of construction common to an aircraft gas turbine engine. For the F-100 engine, the composition is compatible, within certain limitations, with such materials as magnesia-zirconium, aluminide and green glass vitreous coatings, nickel, titanium and steel alloys, silicon rubbers, polyimides and graphite carbon. Limitations to this compatibility primarily concern temperature, as the composition chemistry may be altered above 38° C. (100° F.) or below 0° C. (32° F.). Therefore, if the ambient temperature is above 38° C. (100° F.) or below 0° C.(32° F.), the composition should not be used. Accordingly, an engine should be idle at least three hours prior to cleaning to assure sufficient engine cooling before composition application. This composition is not compatible with copper alloys.

While the combined cleaning composition is compatible with aluminum alloys, the two individual ingredient solutions of the preferred embodiment are not. Therefore, proper mixing is required to prevent engine damage. It will be understood by one skilled in the art that, notwithstanding the above discussion, prudence dictates actual testing on the materials of construction of components used in a particular engine before the application of any chemical agent.

While the preferred embodiments of the present invention are discussed in relation to cleaning an F-100 engine, it will be understood by those skilled in the art that modifications in terms of wash cycle, engine type, application means, rinsing cycle, or rinsing solution can be made without varying from the present invention.

We claim:

1. A method for chemically dislodging deposits from the internal components of a gas turbine engine, while preserving the alloys or coatings used therein, said method comprising the steps of:

(a) contacting said deposits on said components with a cleaning composition comprising an aqueous solution of 0.1–2.0 molar hydroxylamine sulfate, a chelating agent, 0.1–4.0 molar concentration of a compound selected from the group consisting of ammonium sulfamate, sulfamide and hydroxylamine-o-sulfonic acid, and, an alkaline pH modifying substance added in an amount sufficient to achieve a pH value of from 6.5 to 14, thereby chemically dislodging said deposits from said components; and (b) contacting said components with an amount of a rinse solution sufficient to remove said dislodged deposits and said cleaning composition from said engine.

2. The method of claim 1 wherein the cleaning composition additionally comprises up to 2.0 molar ethylenediamine.

3. The method of claim 1 wherein said rinse solution comprises water.

4. The method of claim 1 wherein, after said contacting but before said rinsing:

(1) allowing said cleaning composition to soak into said deposits on said components; and (2) repeating said contacting and said soaking steps cyclically until said deposits are dislodged from said components.

5. The method of claim 1 wherein said cleaning composition comprises an aqueous solution of 0.4 molar hydroxylamine sulfate, 0.4 molar ethylene diamine, 0.7 molar amonium sulfamate, and 0.8 molar N-hydroxyethylenediaminetriacetic acid with ammonium hydroxide added in an amount sufficient to achieve a pH value of between 7 and 8.5.

6. A method for chemically dislodging deposits from the internal components of a gas turbine engine installed on an aircraft, while preserving the alloys or coatings used therein, said method comprising:

(a) preparing a first solution of hydroxylamine sulfate and water, having a pH of less than 4;

(b) preparing a second solution comprising a chelating agent, a compound selected from the group consisting of ammonium sulfate, sulamide, and hydroxylamine-o-sulfonic acid, and, an alkaline pH modifying substance added in an amount sufficient to achieve a pH of between 9 and 14, (c) mixing said first and second solutions to form a cleaning composition comprising an aqueous solution of 0.1–2.0 molar hydroxylamine sulfate, a chelating agent, 0.1–4.0 molar concentration of a compound selected from the group consisting of ammonium sulfamate, sulfamide and hydroxylamine-o-sulfonic acid, and, an alkaline pH modifying substance, said composition having a pH of between 6.5 and 14, (d) contacting said deposits on said components with said cleaning composition, thereby chemically dislodging said deposits from said components;

(e) contacting said components with amounts of a rinse solution sufficient to remove said dislodged deposits and said cleaning composition from said engine, and, (f) drying said engine.

7. The method of claim 6 wherein the cleaning composition additionally comprises up to 2.0 molar ethylenediamine.

8. The method of claim 6 wherein said rinse solution comprises water.

9. The method of claim 6 wherein, after said contacting with said cleaning composition but before said rinsing;

(a) allowing said cleaning composition to soak into said deposits on said components; and (b) repeating said contacting and said soaking steps cyclically until said deposits are dislodged from said compenents.

10. The method of claim 6 wherein said first solution comprises an aqueous solution of about 0.8 molar hydroxylamine sulfate, having a pH of from 3–4; said second solution comprises an aqueous solution of about 1.4 molar ammonium sulfate, about 1.6 molar N-hydroxyethylethyenediaminetriacetic acid with ammonium hydroxide added in an amount sufficient to achieve a pH of between 9 and 10; and, said cleaning composition comprises an aqueous solution of about 0.4 molar hydroxylamine sulfate, about 0.4 molar ethylenediamine, about 0.7 molar ammonium sulfate, and about 0.8 molar N-hydroxyethylethyenediaminetriacetic acid with ammonium hydroxide added in an amount sufficient to achieve a pH value of between 7 and 8.5.

* * * * *

UNITED STATES PATENT AND TRADEMARK OFFICE

CERTIFICATE OF CORRECTION

PATENT NO. : 4,713,120

DATED : December 15, 1987

INVENTOR(S) : Henry M. Hodgens, II and William A. Cellich

It is certified that error appears in the above-identified patent and that said Letters Patent is hereby corrected as shown below:

Column 2, line 24 change "and" (second occurrence) to --any--.

Column 2, line 34 change "dissembling" to --disassembling--.

Column 7, line 23 change "sulfate, sulamide" to --sulfamate, sulfamide--.

Column 8, lines 26 and 32 change "sulfate" to --sulfamate--.

Signed and Sealed this

Sixth Day of September, 1988

*Attest:*

DONALD J. QUIGG

*Attesting Officer*

*Commissioner of Patents and Trademarks*